US007392350B2

(12) United States Patent
Fields, Jr. et al.

(10) Patent No.: US 7,392,350 B2
(45) Date of Patent: Jun. 24, 2008

(54) METHOD TO OPERATE CACHE-INHIBITED MEMORY MAPPED COMMANDS TO ACCESS REGISTERS

(75) Inventors: James Stephen Fields, Jr., Austin, TX (US); Michael Stephen Floyd, Austin, TX (US); Paul Frank Lecocq, Cedar Park, TX (US); Larry Scott Leitner, Austin, TX (US); Kevin Franklin Reick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/055,160

(22) Filed: Feb. 10, 2005

(65) Prior Publication Data

US 2006/0179251 A1 Aug. 10, 2006

(51) Int. Cl.
*G06F 13/28* (2006.01)
(52) U.S. Cl. .................. 711/146; 711/138; 711/118; 712/16
(58) Field of Classification Search .............. 711/146, 711/138; 712/16
See application file for complete search history.

(56) References Cited

U.S. PATENT DOCUMENTS

| | | | | |
|---|---|---|---|---|
| 5,347,648 A | * | 9/1994 | Stamm et al. .................. 714/5 |
| 6,266,744 B1 | * | 7/2001 | Hughes et al. ............... 711/146 |
| 6,470,429 B1 | * | 10/2002 | Jones et al. .................. 711/138 |
| 6,484,230 B1 | * | 11/2002 | Konigsburg et al. ......... 711/100 |
| 6,591,321 B1 | * | 7/2003 | Arimilli et al. ............... 710/110 |
| 2004/0215885 A1 | * | 10/2004 | Cargnoni et al. ............ 711/135 |
| 2004/0215929 A1 | * | 10/2004 | Floyd et al. .................... 712/16 |
| 2006/0092957 A1 | * | 5/2006 | Yamazaki .................... 370/402 |

OTHER PUBLICATIONS

U.S. Appl. No. 11/055,404, Fields, Jr. et al., Method for Indirect Access to a Support Interface for Memory-Mapped Resources to Reduce System Connectivity from Out-of-Band Support Processor, Feb. 10, 2005.
U.S. Appl. No. 11/055,675, Fields, Jr. et al., Method for Providing Low-Level Hardware Access to In-Band and Out-of-Band Firmware, Feb. 10, 2005.

* cited by examiner

*Primary Examiner*—Reginald G. Bragdon
*Assistant Examiner*—Victor W. Wang
(74) *Attorney, Agent, or Firm*—Duke W. Yee; Diana R. Gerhardt; Theodore D. Fay, III

(57) ABSTRACT

In a multiprocessor environment, by executing cache-inhibited reads or writes to registers, a scan communication is used to rapidly access registers inside and outside a chip originating the command. Cumbersome locking of the memory location may be thus avoided. Setting of busy latches at the outset virtually eliminates the chance of collisions, and status bits are set to inform the requesting core processor that a command is done and free of error, if that is the case.

5 Claims, 4 Drawing Sheets

FIG. 3

| 16 | 25 26 | 31 32 | 35 36 | 55 56 | 57 58 | 59 60 | 61 63 |
|---|---|---|---|---|---|---|---|
| BASE ADDRESS | PROCESSOR CHIP SELECT | SUPPORT CHIP FSI PORT SELECT | SCOM ADDRESS | COMMAND TYPE | INTERLEAVE SELECT | CASCADED SUPPORT CHIP POSITION | DOUBLE WORD ALIGN |
| 301 | 303 | 305 | 307 | 309 | 311 | 313 | 315 |

METHOD TO OPERATE CACHE-INHIBITED MEMORY MAPPED COMMANDS TO ACCESS REGISTERS

BACKGROUND OF THE INVENTION

1. Technical Field

The present application is related to co-pending application entitled "METHOD FOR INDIRECT ACCESS TO A SUPPORT TNTERFACE FOR MEMORY-MAPPED RESOURCES TO REDUCE SYSTEM CONNECTIVITY FROM OUT-OF-BAND SUPPORT PROCESSOR", Ser. No. 11/055,404, and application entitled "METHOD FOR PROVIDING LOW-LEVEL HARDWARE ACCESS TO IN-BAND AND OUT-OF-BAND FIRMWARE", Ser. No. 11/055,675, all filed on even date herewith. The present invention generally relates to computer systems, and more specifically to an improved method of allowing firmware to access system status and configuration registers in a multi-processor system.

2. Description of Related Art

The basic structure of a conventional symmetric multi-processor computer system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or fabric bus 16. Fabric bus 16 is connected to one or more service processors 18a, 18b, a system memory device 20, and various peripheral devices 22. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory device 20 (random access memory or RAM) stores program instructions and operand data used by the processing units, in a volatile (temporary) state. Peripherals 22 may be connected to fabric bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the PowerPC™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 12a, 12b includes an on-board (L1) cache (actually, separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, such as a second level (L2) cache 28 which, along with a memory controller 30, supports both of the L1 caches that are respectively part of cores 26a and 26b. Additional cache levels may be provided, such as an L3 cache 32 which is accessible via fabric bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board, pluggable module, or similar field replaceable unit (FRU), which can be easily swapped installed in or swapped out of system 10 in a modular fashion. A command unit is a generic term that includes, among others, processor cores, and the service processors (which may also be called flexible service processor).

A prior art architecture shown in published US patent application US 2004/0215929 "Cross-chip communication mechanism in distributed node topology", discloses a predecessor external scan communications command XSCOM. Therein was shown an alternative method to provide supervisory commands to core processors through the use of a ring connected set of registers within a chip and extending between chips. The disclosed method had the advantage that commands circulated by way of the old XSCOM didn't have to interrupt fabric bus transported commands.

However, the old XSCOM method, because it used a relatively low bandwidth medium, required significant overhead to place locks on the so called 'mode ring'. Such locks could be placed by the service processor, or by individual threads operating on the cores of a chip.

In addition, the old XSCOM method had the drawback that once a XSCOM operation was initiated, the thread that owned that operation had to poll for status in order to receive the result. As can be seen, the old XSCOM required several instruction cycles to complete, which further required that the processor core had to gate off interrupts to avoid being interrupted during these cycles.

The architecture described above typically used a logical partition debugger and maintenance program known as the 'hypervisor', that allows, among other things, multiple computing environments on the same platform. The Hypervisor in a typical configuration would operate on one processor core. In order to coordinate functions on other chips, i.e. inter-chip commands, the Hypervisor needed to activate functions on a third command unit. This activity had the attendant drawback that in order to do this, many machine language instructions were needed, including a software lock on the resources of the target command unit. This meant that collisions of multiple processor cores needed to be avoided during the many machine instructions, as well as preventing the one or more service processors from trying to access the same facility at the same time.

SUMMARY OF THE INVENTION

In this manner we provide, in a multiprocessor environment, improved communication between processors and from the processor to configuration registers on other chips in the system via external scan communications (XSCOM). Following prior art, a subset of control, mode, and status registers on each chip are normally made available to the service processor through a special scan communications (SCOM, PSCOM) path in the hardware. This invention also makes available that subset of registers to firmware running on the processors via the XSCOM mechanism.

An embodiment also may provide a way to initiate an XSCOM command with an architected instruction that already exists in the IBM Power RISC architecture without adding new instructions to the ISA, preferably using a cache-inhibited (CI) load and a CI store.

An embodiment is shown to address the XSCOM command to the appropriate chip in the system using a real memory address space assigned for use by XSCOM. This allows the firmware to use CI loads and CI stores to access these SCOM registers through a memory-mapped address space, greatly simplifying the programming model. Prior art used multiple commands to multiple registers to perform one operation; this invention allows one instruction to perform one XSCOM operation.

We also provide a means to perform XSCOM operations without the need to poll for status information on the success or failure of the XSCOM operation itself.

In addition we provide an error detection and reporting mechanism for XSCOM in lieu of polling for status.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an address map of cache-inhibited read or write commands of an embodiment, wherein relative locations of bit-fields are shown according to an embodiment of the invention.

DETAILED DESCRIPTION OF THE PREFERRED EMBODIMENT

Figure 1:
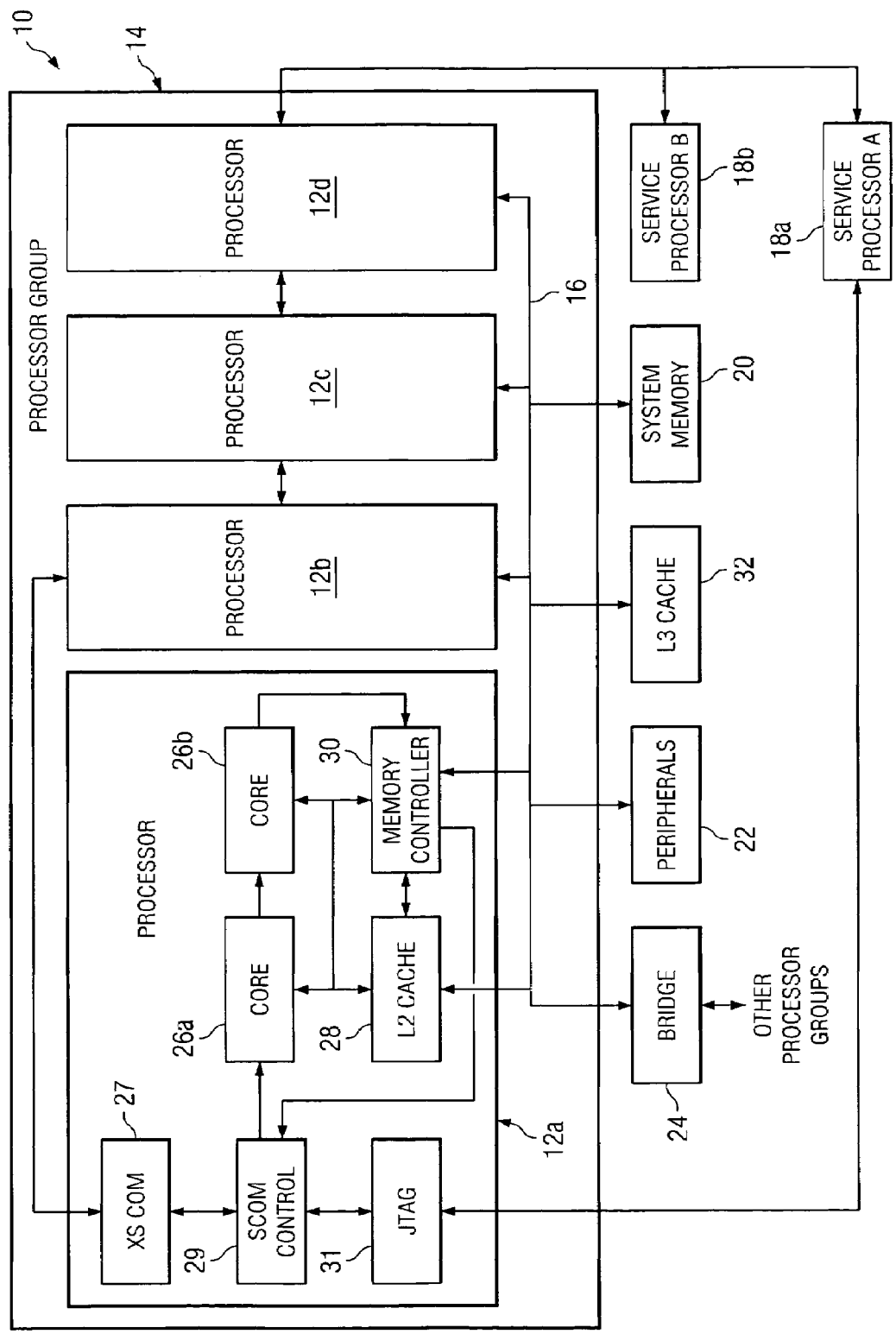
FIG. 1 is a prior art symmetric multiprocessor having an external scan communication macro according to an embodiment of the invention.
Figure 2:
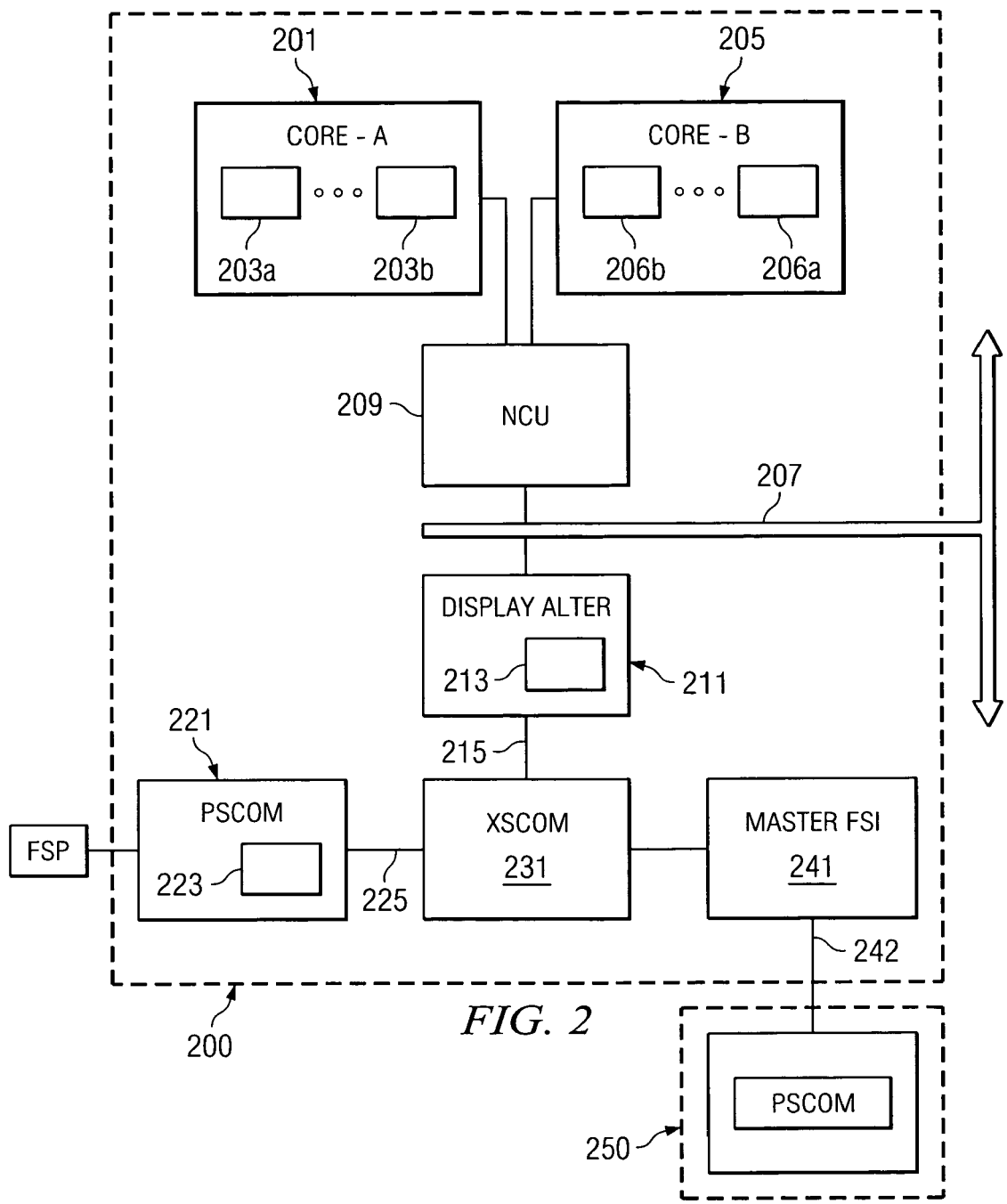
FIG. 2 is a block diagram of an embodiment of the invention according to an embodiment of the invention.

FIG. 2 shows an embodiment capable of transporting an atomic XSCOM command along the fabric bus 207. PSCOM (Parallel SCOM) 221 is directly connected to various "SCOM satellites" located in the clock-controlled components via serial address and data buses. These satellites are connected to control, mode, and status registers, referred to as SCOM registers. In the FIG. 2 embodiment, there are six SCOM satellites shown, first core-a satellite 203a, a second core-a satellite 203b, first core-b satellite 206a, and a second core-b satellite 206b. Display/Alter satellite 213 is located in the circuits of Display/Alter device 211, while PSCOM satellite 223 is located within the PSCOM unit 221.

Reads and writes from a SCOM register are possible where two or more SCOM register units or satellites are connected in a ring or hub topology, wherein processing-unit-to-processing-unit communication may be accomplished from a "next chip" circuit of one SCOM satellite to a "previous chip" circuit of another SCOM satellite. For simplicity, the lines interconnecting each of the SCOM satellites between each other have been omitted from FIG. 2.

An external scan communications (XSCOM) command may be initiated by software running on either Core A 201 or Core B 205 by executing either a cache-inhibited load command or a cache-inhibited store command to a predefined address space. Each SCOM register in the satellite, e.g. 203a, has a corresponding real-memory address. In the case of a cache-inhibited store, 8 bytes of data may be stored to any SCOM register in the system. Alternatively, a cache-inhibited load may retrieve 8 bytes of data from any SCOM register. There is at least one SCOM register for each SCOM satellite located on chip 200.

In the preferred embodiment, the real memory address outside of the core consists of 48 bits. An exemplary memory-map to address any SCOM register in the system with an XSCOM command is shown in FIG. 3. Base address 301 of the XSCOM address range is programmable and is stored in a SCOM accessible register in Display/Alter unit 211, and may be referred to as a base address range (BAR). Processor chip identification number 303 that either holds the SCOM register being addressed or is connected to a support chip that holds the SCOM register being addressed, may appear in the "processor chip select" field 303 and use bits 26 through 31.

FIG. 3 further shows, "support chip fsi port select" 305, bits 32 through 35 of the XSCOM address map, determines whether the SCOM register being addressed is on processor chip 200 or on support chip 250 connected to the processor chip. If the SCOM register being addressed is on support chip 250, of FIG. 2, "support chip fsi port select" field 305 will identify which among several FSI ports 242 that the support chip with the SCOM register being addressed is attached. Such support chips may provide functions such as L3 cache. If the SCOM register being addressed is on processor chip 300, the hex F pattern may be used to indicate the chip to access is chip 200 itself. This field is used by the external scan communication or XSCOM unit 231 to determine which direction to route the XSCOM command, either to PSCOM unit 221 on processor chip 200 or to Master field replaceable unit (FRU) support interface (FSI) or MFSI unit 241 which connects the processor to the PSCOM unit on support chips 250. Details of the MFSI or master FSI operation are in "METHOD FOR INDIRECT ACCESS TO A SUPPORT INTERFACE FOR MEMORY-MAPPED RESOURCES TO REDUCE SYSTEM CONNECTIVITY FROM OUT-OF-BAND SUPPORT PROCESSOR", Ser. No. 11/055,404, which sometimes calls the MFSI a FSI master, and is herein incorporated by reference.

SCOM address 307 of the register to be accessed may be on bits (36:55). SCOM address portion of the memory-mapped XSCOM address is used by the PSCOM units either on processor chip 200 or on support chips 250 to address which one of the many SCOM registers attached to one of the many SCOM satellites 203a, 203b, 206a, 206b, etc to access.

Bit 56 signals the presence of SCOM command 309, in the case of a '0', and a non-SCOM command 309 using a '1'. SCOM command 309 provides the ability to perform more than just SCOM read and write operations using an XSCOM command. For the purpose of this embodiment, this bit is always '0'.

The data portion of interconnect fabric bus 207 that resides on chip physically consists of 2 sets of 4 interleave buses that are each 8 bytes wide. "Interleave select" 311, bits 57 to 58 of the XSCOM address map, are used to select which interleave bus contains the 8 bytes of XSCOM data. In this embodiment the Display/Alter unit is only connected to interleave 0 of each set of interleaves on the fabric data bus. Therefore the "interleave select" needs to be set to "00" for the Display/Alter data to see the XSCOM data.

Multiple chips may be connected to a single FSI port in cascade. The position of a support chip attached to the FSI port selected in bits 32:35 is held in "cascaded support chip position" field 313 (59:60). Collectively, the "support chip fsi port select" field and the "cascaded support chip position" field may form a support chip address, i.e. an address that uniquely identifies a support chip connected to a processor selected with "processor chip select" 303 within the symmetric multiprocessor system. In cases where more than one chip is attached, these bits are used to select a specific chip. If only one chip is attached to the selected FSI port, then these two bits may be set to '00' to signal that is the case.

Lastly, a real memory address addresses 1 byte of data. Since an XSCOM command consists of 8 bytes of data, it is desired to have the 8 bytes of data aligned on a double word boundary. This double-word alignment may be accomplished by setting "double-word align" 315, bits 61 to 63, to '000'.

Figure 4:
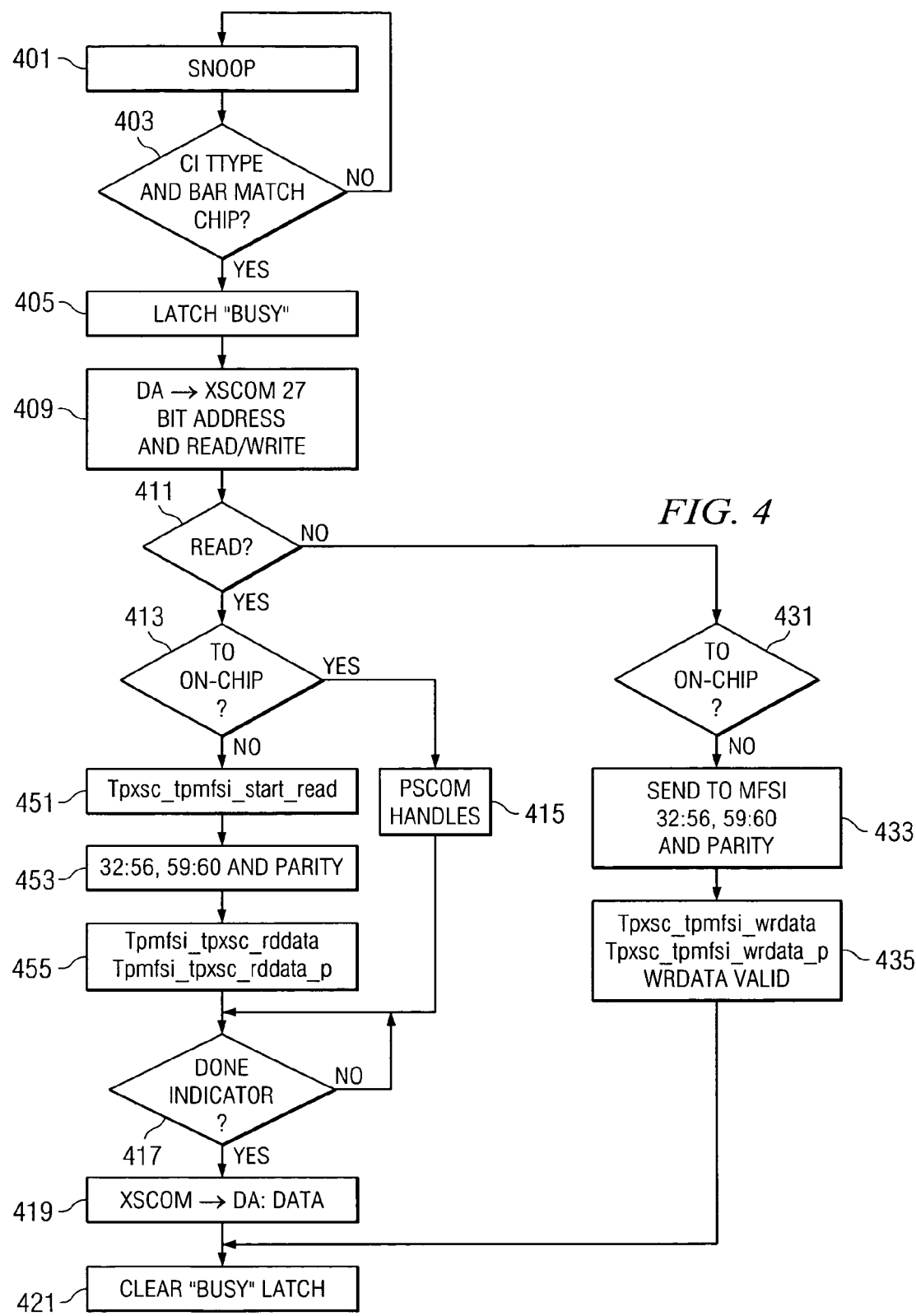
FIG. 4 is a flow diagram showing the steps that an embodiment may perform while handling a cache-inhibited command according to an embodiment of the invention.

The flowchart in FIG. 4 shows the progression of an XSCOM read operation through the system. The software initiates the command by performing a cache-inhibited (CI) load from an XSCOM address as defined above and in FIG. 3. The core forwards the CI load request along with the address, having a CI base address register (CI BAR) and a CI identifier (CI ID) to the Non-Cacheable Unit (NCU) 209, and the NCU then places the command on the fabric bus 207 of FIG. 2.

Again, referring to FIG. 4, each Display Alter (DA) unit 211 of FIG. 2 snoops the CI load request (step 401) and compares the address' CI BAR to see if bits 16 to 25 match (step 403) the DA's the preprogrammed chip base address register (BAR) allowable range, thus indicating that the command is an XSCOM command. Detecting that the CI BAR is in the allowable range is a step of determining that an XSCOM command is on the fabric bus. If the BAR matches the allowable range then the DA unit compares bits 26 to 31 of the address' processor chip select or CI ID to its own unique processor chip identification number or Chip ID. If these match then the DA unit will check to see if there is already a command in progress on the chip. This is done by checking a busy latch that is set when a command is accepted. If the busy latch is set, meaning that a command is already in progress then the DA unit will send a retry response back to the initiating NCU, and the initiating NCU will retry the command. This will continue until the DA unit completes the command that is in progress and clears the busy latch. If the busy latch is not set then the DA unit sends an acknowledgement response back to the initiating NCU 209 of FIG. 2 to indicate that the command has been accepted. The DA unit will then set the busy latch (step 405) and forward (step 409) bits 32 to 56 and bits 59 to 60 of the address and an indication that it is a read command to the XSCOM unit 231 of FIG. 2.

The XSCOM unit 231 will look at the "support chip FSI port select" 305, bits 32 to 35 of the XSCOM address to determine if the request is addressing a SCOM register on the processor chip or a SCOM register on one of the support chips attached to the master FSI (MFSI) port. If the "support chip FSI port select" is a PSCOM directive, which may be represented by 0xF (so long as the bit pattern doesn't match an address of a support chip), then the read will be directed by XSCOM to the Parallel Scan Communication (PSCOM) unit for further processing and retrieval of data from the SCOM register addressed with the "SCOM address". If the "support chip FSI port select" selects a valid MFSI port (step 413) then the "read" will be directed by XSCOM to the MFSI unit for further processing and retrieval of data from the support chip and SCOM register addressed (step 453) with the "support chip FSI port select", "SCOM address", and "cascaded support chip position". The "command type" is also forwarded to the MFSI (step 451) to allow other types of read commands (non-SCOM) to be performed on a support chip connected to an MFSI port. If the "support chip FSI port select" is not the PSCOM directive (0xF) or a valid MFSI port, then an "address not acknowledged" error occurs, and the read attempt is aborted. Otherwise, read data is obtained (step 455).

XSCOM may then wait for a done indication (step 417) to be received from PSCOM 221 or MFSI 241 of FIG. 2 whichever was addressed. Once the done indication and data are received from either PSCOM 221 or MFSI 241, XSCOM 231 may pulse a corresponding done line to the DA 211 along with transmitting the read data.

The DA finishes by both clearing (step 421) the busy latch set earlier, and forwarding (step 419) the data back to the initiating NCU 209.

If an error occurs such as an "address not acknowledged" as described earlier, or any other detectable error, the XSCOM read command will be aborted. The initiating software is still be expecting data back from the CI load operation, therefore a fail signature of all 1's data is returned to the initiating software to indicate an error has possibly occurred. At the same time, a separate transaction is initiated on the fabric to send error and done status back to the processor chip that initiated the XSCOM read request. This data is propagated through the system back to the initiating core and will set an interrupt, or error status bit, in the core. When the software requesting the read sees the all 1's data returned, it is required to check for the interrupt or error status bit to see if the all 1's data was an error or valid data. The separate transaction to report status back to the initiating processor chip is sent every time that an XSCOM command is completed successfully or aborted. This status information may be provided in a separate software accessible register in each of the cores (not pictured) and is used to alert software used to monitor system integrity and may be known as the Hypervisor Maintenance Error Register (HMER). Bits set may be, in the case of an XSCOM command done, a done bit or bit 15, and in the case of XSCOM command fail bit or bit 14.

The flowchart in FIG. 4 shows the progression of an XSCOM write operation through the system. The software initiates the command by performing a cache-inhibited (CI) store to an XSCOM address as defined above and in FIG. 3. The core forwards the CI store request along with the address, having a CI base address register (CI BAR) and a CI identifier (CI ID), and data to the Non-Cacheable Unit (NCU) 209, and the NCU then places the command request along with the address on the fabric bus 207.

The Display Alter (DA) unit 211 snoops (step 401) the CI store request and compares the address' CI BAR to see if bits 16 to 25 of the address match (step 403) the DA's 211 preprogrammed chip base address register (BAR) which indicates that the command is an XSCOM command. If the BAR matches then the DA unit compares bits 26 to 31 of the address' processor chip select or CI ID to its own unique processor chip identification number or Chip ID. If these match then DA unit 211 will check to see if there is already a command in progress on the chip by checking a busy latch. If the busy latch is set, meaning that a command is already in progress then the DA unit will send a retry response back to the initiating NCU, and the NCU will retry the command. This will continue until the DA unit completes the command that is in progress and clears the busy latch. If the busy latch is not set then the DA unit sends an acknowledgement, response back to the initiating in accordance with the preferred embodiment of the present invention NCU 209 to indicate that the command has been accepted. The DA unit will then set the busy latch (step 405) and wait for the data to be sent from the initiating NCU.

When the initiating NCU sees the "command acknowledged" response from the destination DA unit, it will place the write data on the fabric, along with a data tag to route the data to the correct DA unit on the correct chip. Once the DA unit has received the write data, it will forward (step 409) bits 32 to 56 (305, 307, 309) and bits 59 to 60 (313 of FIG. 3) of the address, along with the write data and an indication (step 411) that it is a write command to XSCOM unit 231 of FIG. 2.

XSCOM unit 231 will look at the "support chip FSI port select" bits 32 to 35 of XSCOM address to determine if the request is addressing a SCOM register on the processor chip or a SCOM register on one of the support chips attached to the master FSI (MFSI) port 241. If the "support chip FSI port select" is a PSCOM directive, which may be represented by 0xF, (step 413) then the write will be directed by XSCOM to the Parallel Scan Communication (PSCOM) unit (step 415) for further processing and storage of the write data to the SCOM register addressed with the "SCOM address" 307. If the "support chip FSI port select" selects a valid MFSI port then the write will be directed by XSCOM 231 to the MFSI unit 241 for further processing. Storage of the write data to the support chip and SCOM register includes sending the addressing information including support chip address (step 433 and "SCOM address" 307. The "command type" 309 is also forwarded to the MFSI to allow other types of write commands (non-scom) to be performed on a support chip connected to an MFSI port. Write data, and when available, the "write data valid" signal is forwarded (step 435 to the MFSI. If the "support chip FSI port select" is not 0xF or a valid MFSI port, then an "address not acknowledged" error occurs, and the write attempt is aborted.

XSCOM may then wait for a done indication (step 417) to be returned from PSCOM 221 or MFSI 241 whichever was addressed. Once the done indication is received from either PSCOM 221 or MFSI 241 of FIG. 2, or an error has occurred causing the write to be aborted, XSCOM 231 may pulse a corresponding done line to the DA 211.

DA 211 finishes by clearing (step 421) the busy latch set earlier.

If an error occurs such as an "address not acknowledged" as described earlier, or any other detectable error, the XSCOM write command will be aborted. A separate transaction is initiated on the fabric to send error and done status back to the processor chip that initiated the XSCOM write request. This status data is propagated through the system back to the initiating core and will set an interrupt, or error status bit, in the core. The software can either check the status bit or wait to be interrupted to see if the write command complete successfully. The separate transaction to report status back to the initiating processor chip is sent every time that an XSCOM command is completed successfully or aborted. This status information may be provided in a separate software accessible register in each of the cores (not pictured) and is used to alert software used to monitor system integrity and may be known as the Hypervisor Maintenance Error Register (HMER). Bits set may be, in the case of an XSCOM command done, a done bit or bit 15, and in the case of XSCOM command fail bit or bit 14.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for executing a cache-inhibited write in a symmetric multi-processor having a fabric bus, a chip base address range, and a chip identifier, the method comprising the steps of:

snooping for a cache inhibited command on the fabric bus, wherein the cache inhibited command has a cache inhibited base address range and a cache inhibited identifier;

determining whether the cache inhibited command is an external scan communications command;

responsive to a determination that the cache inhibited command is an external scan communications command; determining whether the cache inhibited identifier matches the chip identifier;

responsive to a determination that the cache inhibited identifier matches the chip identifier, setting a busy latch;

transmitting a support chip address and a command type to an external scan communication unit;

responsive to a determination that the command type is a write command, forwarding the support chip address to a master field replaceable unit support interface;

forwarding write data, and a write data valid signal to the master field replaceable unit support interface;

responsive to a determination that a parallel scan communication directive is in a support chip field replaceable unit support interface port select, directing the write data to a parallel scan communication unit; and clearing the busy latch after forwarding the write data.

2. The method of claim 1 further comprising:

detecting whether a busy latch is set before setting the busy latch;

sending a retry response to an initiating Non-Cacheable Unit;

snooping for a cache inhibited command on the fabric bus, wherein the cache inhibited command has a cache inhibited base address range and a cache inhibited identifier; and detecting when the busy latch is cleared.

3. The method of claim 2 further comprising:

sending an error status and a done status to an initiating processor chip.

4. The method of claim 3 further comprising:

setting a fail bit in a hypervisor maintenance register if an error occurs.

5. The method of claim 4 further comprising:

setting a done bit in a hypervisor maintenance register.

* * * * *